Oct. 7, 1952

D. RICHMAN 2,613,315

SUPERREGENERATIVE SYSTEM FOR RECEIVING ANGULAR-VELOCITY-MODULATED WAVE-SIGNALS

Filed June 25, 1948

3 Sheets-Sheet 1

INVENTOR.
DONALD RICHMAN

BY John A. Harvey

ATTORNEY

Oct. 7, 1952 D. RICHMAN 2,613,315

SUPERREGENERATIVE SYSTEM FOR RECEIVING ANGULAR-VELOCITY-MODULATED WAVE-SIGNALS

Filed June 25, 1948 3 Sheets-Sheet 2

INVENTOR.
DONALD RICHMAN

BY John A. Harvey

ATTORNEY

INVENTOR.
DONALD RICHMAN
BY John A. Harvey
ATTORNEY

Patented Oct. 7, 1952 2,613,315

UNITED STATES PATENT OFFICE 2,613,315

SUPERREGENERATIVE SYSTEM FOR RECEIVING ANGULAR-VELOCITY-MODULATED WAVE SIGNALS

Donald Richman, Flushing, N. Y., assignor to Hazeltine Research, Inc., Chicago, Ill., a corporation of Illinois Application June 25, 1948, Serial No. 35,243

10 Claims. (Cl. 250—20)

Figure 1:
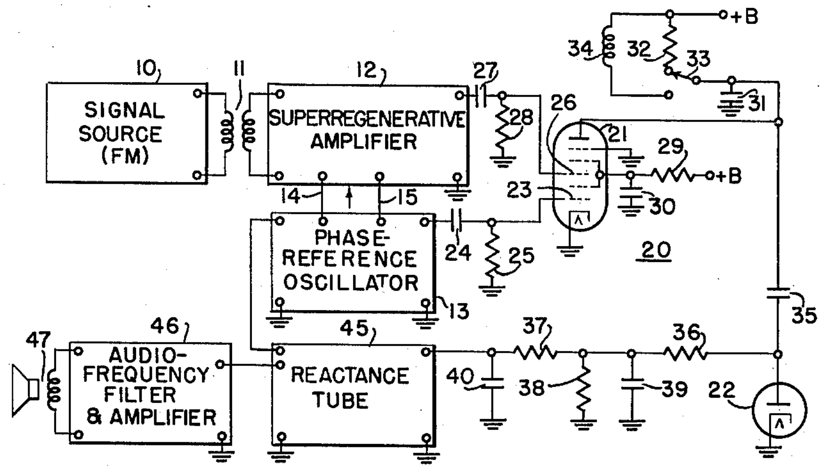

The present invention is directed to wave-signal receiving systems of the superregenerative type which are particularly suited for the reception of angular-velocity-modulated wave signals. The expression "angular-velocity-modulated wave signal" is used in the present specification and the appended claims in a generic sense to define a wave signal which is either frequency-modulated or phase-modulated in accordance with the intelligence to be conveyed. However, since frequency modulation is the more usual form of transmission, the invention will be described in detail in that connection.

It is well understood that a superregenerative receiver comprises a regenerative oscillatory circuit and a quenching arrangement. The latter constitutes an integral part of the regenerative circuit in the case of receivers of the self-quenching type or constitutes a separate signal source coupled to the regenerative circuit in the case of separately quenched receivers. In either form the quenching arrangement controls the conductance of the regenerative circuit, causing it to undergo repeating cycles in which the conductance has positive and negative values in alternate operating intervals. During any negative-conductance interval, this circuit exhibits an extraordinarily high gain and produces oscillations that are quenched or damped in the next succeeding interval of positive conductance. The oscillations which are thus periodically produced have a characteristic, such as an amplitude characteristic, which manifests the modulation of a received wave signal at the time the oscillations are initiated. Those oscillations may be utilized in any of several well-recognized methods to derive the modulation components of the received signal.

The use of such a receiver in the reception of amplitude-modulated waves is exceedingly well known at the present time. In general, the quenching frequency is selected to be low relative to the oscillatory frequency of the regenerative circuit but at least twice as high as the highest modulation-frequency component to be accommodated. In operation, the amplitude variations of the received signal control the oscillation peak amplitude, the self-quench frequency, or the duration of the oscillation interval in each quench cycle so that an output signal obtained from the receiver manifests the modulation components of the received signal.

It is also known that superregenerative receivers may be employed in the reception of frequency-modulated wave signals. If such a receiver is side-tuned to the mean frequency of the frequency-modulated signal, the frequency excursions of the latter are converted to amplitude variations in view of the sloping response which is characteristic of side-tuned operation. Having effected a conversion to amplitude modulation, the receiver may function in a manner generally similar to that explained above to derive the desired modulation components of the received signal. Since the receiver is primarily responsive to amplitude variations of the applied signal, undesired amplitude modulation superimposed on the received frequency-modulated signal is derived with the frequency-modulation components.

The present invention concerns a novel superregenerative system for receiving a frequency-modulated wave signal and exhibiting improved amplitude-modulation rejecting properties. The invention is related to the invention disclosed and claimed in a concurrently filed application of Bernard D. Loughlin, Serial No. 35,257, entitled "Angular-Velocity-Modulation Wave-Signal Translating System." This related application describes a superregenerative system for translating an angular-velocity-modulated wave signal and for obtaining the modulation components thereof by means of a phase comparison effected in a superregenerative or blocking type of detector in which the phase of the received signal is contrasted with a phase-reference signal. In the Loughlin application, the phase-reference signal is comprised by the residual oscillations in the superregenerative detector which in this instance has such damping that oscillations of one quench cycle carry over to the next quench cycle. In the instant arrangement, a continuous-phase reference signal is supplied by a separate signal generator.

The system to be described is also closely related to the subject matter of applicant's concurrently filed application Serial No. 35,244, entitled "Superregenerative System for Receiving Angular-Velocity-Modulated Wave Signals." Applicant's copending application concerns a superregenerative system which is generally similar to that of the Loughlin application referred to above, differing primarily in that the phase-reference signal utilized in deriving the desired modulation components is a continuous signal such as that generated by a blocking oscillator which has hang-over or residual oscillations enduring throughout each blocking interval. In both of those concurrently filed applications, the phase comparison is effected within a superregenerative or blocking detector, whereas in practicing the present invention a superregenerative amplifier is employed only to produce oscillations which represent the phase of the received signal in recurring sampling intervals, these oscillations being utilized in a separate phase detector for the purpose of deriving the desired modulation components.

It is an object of the present invention to provide a new and improved superregenerative system for receiving an angular-velocity-modulated wave signal.

It is another object of the invention to provide a superregenerative receiver, for detecting an angular-velocity-modulated wave signal, which exhibits improved amplitude-modulation rejecting properties.

In accordance with the present invention, a system for receiving an angular-velocity-modulated wave signal comprises a superregenerative amplifier, arranged to have a modulated signal applied thereto, for generating in each quench cycle thereof oscillations that have a phase varying with the phase of the modulated signal during the maximum-sensitivity period of each quench cycle. The system also comprises a signal generator, including a blocking oscillator having residual oscillations throughout each blocking interval, for generating a continuous-phase reference signal. The system further includes an impedance network coupled in circuit with the superregenerative amplifier and the oscillator for synchronizing the quenching action of the amplifier and the blocking action of the oscillator. A phase detector is provided for receiving and for comparing the apparent relative phase of the oscillations of the superregenerative amplifier and the phase-reference signal to develop an output signal having characteristic variations representing the modulation components of the modulated signal. Finally, the system includes means responsive to the output signal of the phase detector to tend to maintain a substantially fixed apparent phase relationship between the oscillations of the amplifier and the phase-reference signal.

For a better understanding of the present invention, together with other and further objects thereof, reference is had to the following description taken in connection with the accompanying drawings, and its scope will be pointed out in the appended claims.

Figure 5:
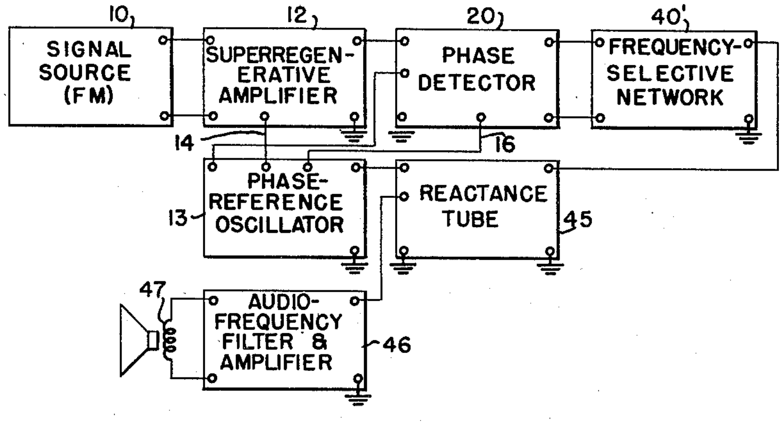
Figure 6:
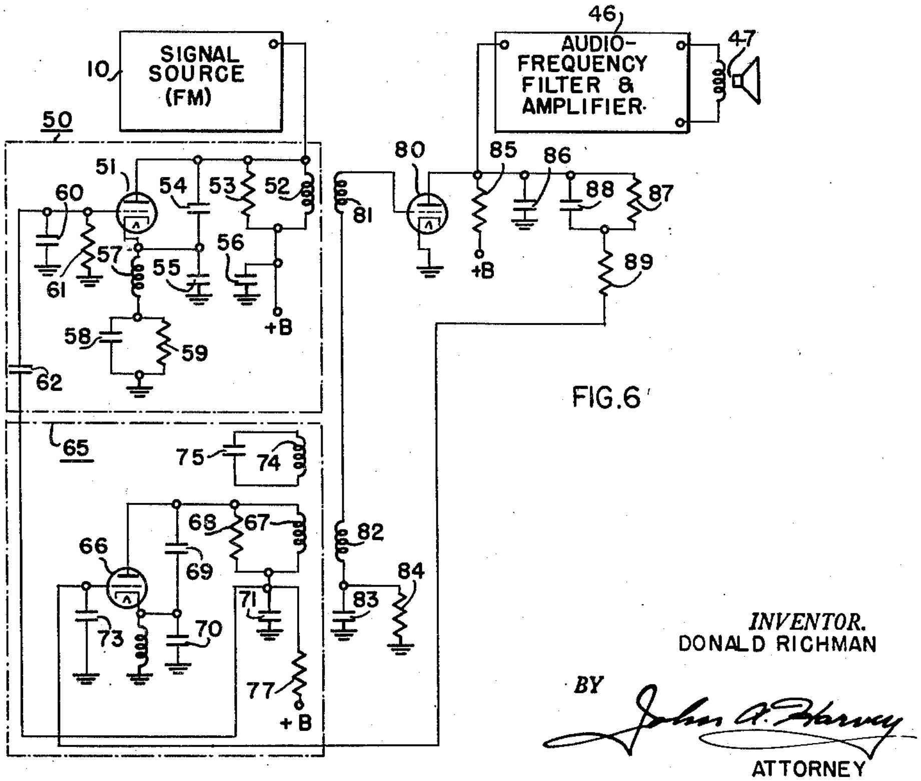

In the drawings, Fig. 1 is a circuit diagram, partly schematic, of a complete system for receiving an angular-velocity-modulated wave signal and embodying the present invention in one form; Figs. 2*a*–2*d*, Fig. 3 and Fig. 4, comprise curves utilized in explaining operating characteristics of the Fig. 1 arrangement; Fig. 5 is a schematic representation of a receiving system essentially like that of Fig. 1 but including a modified form of the invention; and Fig. 6 represents, partly schematically, a further embodiment of the present invention.

Referring now more particularly to Fig. 1 of the drawings, the system there represented is adapted to receive and translate an angular-velocity-modulated wave signal, such as a frequency-modulated carrier-wave signal. The signal to be translated is indicated as originating in a source 10 which may, for example, comprise an antenna system for intercepting a signal transmitted from a remote transmitting station. The signal will be considered to have a given mean frequency. A transformer 11 couples the source 10 to a superregenerative amplifier 12 to which the modulated signal is to be applied.

In order that the modulation components of the applied signal may be derived on the basis of a phase comparison, the system under consideration also comprises a signal generator including a blocking oscillator 13 for generating a continuous-phase reference signal. The damping of the blocking oscillator is chosen so that the oscillator has what is known as "hang-over." A blocking oscillator with hang-over is one in which the oscillations generated in one conductive interval of the oscillator tube carry over in the tuned circuit of the oscillator to the next conductive interval so that residual oscillations are present in the tuned circuit throughout each blocking period. The blocking oscillator 13, for use in generating a continuous-phase reference signal, may also be defined as a relaxation oscillator that has residual oscillations throughout those intervals which intervene the oscillation-generating periods.

For proper operation of the receiving system, means are provided for synchronizing the quenching action of the superregenerative amplifier 12 and the blocking action of the oscillator 13. Since a blocking oscillator is similar in nature to a superregenerative circuit in that each periodically generates oscillations which are subsequently damped, the synchronizing means may expeditiously take the form of means for deriving a quench signal from either the amplifier 12 or the oscillator 13 and for applying the quench signal to the other of these units. In the particular arrangement represented in Fig. 1, oscillator 13 is of the self-quenching type which generates its own blocking or quenching signal. The connections designated 14 and 15 comprise means for deriving a quench signal from the blocking oscillator 13 and for applying that signal to a vacuum tube included in the superregenerative amplifier 12. Frequently the quench signal is delivered to the control electrode-cathode circuit of the superregenerator tube. Circuit arrangements for deriving and supplying a quench signal from the blocking oscillator to such a tube are illustrated and described in detail hereinafter in connection with a further embodiment of the invention.

Output circuits of both the amplifier 12 and the oscillator 13 are coupled to a phase detector 20 wherein the modulation components of the received signal are to be derived. While the phase detector may take any of a variety of forms, it is shown as including a pentagrid converter or mixer tube 21 and a diode detector 22. The first control electrode 23 of the mixer is coupled to the oscillator 13 through a series condenser 24 and a shunt resistor 25. As will become apparent hereinafter, elements 24 and 25 in conjunction with the input electrodes of the tube 21 comprise means associated with the detector for effectively disabling the detector except during saturation intervals of the blocking oscillator 13.

The second control electrode 26 of the tube 21 is coupled to the output circuit of the amplifier 12 through a series condenser 27 and a shunt resistor 28. The screen electrode of the tube is connected through a resistor 29 to a source of unidirectional potential, indicated +B, and is also connected to ground through a condenser 30. Preferably, the values of the elements 29 and 30 are selected to provide a time constant for the screen circuit which is large compared with the period corresponding with the quenching frequency of the superregenerative amplifier 12, and also large compared to the period of the lowest modulation-frequency components to be derived. The cathode of the tube 21 is directly grounded and its anode is coupled to ground through a condenser 31 and to a source of unidirectional potential +B through a resistor 32 when a switch 33 is closed against the contact to which the resistor 32 is connected. Alternatively, the anode electrode may be coupled to the unidirectional source through an inductor 34 when the switch 33 is operated to its other position. A condenser 35 couples a diode detector 22 to the anode-cathode circuit of the mixer tube 21 and a frequency-selective filter network is provided as a load for the diode. This network is of the low-pass type and comprises series resistors 36 and 37, a shunt resistor 38 and shunt-connected condensers 39 and 40.

The frequency-selective network 36—40 couples the phase detector 20 to a reactance tube 45, the latter constituting means responsive to the output signal of the phase detector 20 for varying an operating frequency of the receiving system 10 to maintain a substantially fixed phase relationship between the oscillations periodically generated in the superregenerative amplifier 12 and the continuous-phase reference signal derived from oscillator 13, as will be described more fully hereinafter. In particular, the reactance tube 45 is coupled to the oscillator 13 to vary the oscillatory frequency thereof in a sense seeking to establish and maintain desired phase relations in the receiving system. The output circuit of the reactance tube 45 is also coupled to an audio-frequency filter and amplifier 46 so that advantage may be taken of the amplitude gain exhibited by the reactance tube. A sound-signal reproducing device 47 is coupled to the output circuit of unit 46 to reproduce the modulation components included in the output signal of the phase detector 20 and selected by the audio-frequency filter for utilization.

Units 10, 12, 13, 45 and 46 of the receiver are shown in block diagram because they may be of any well-known design and construction. Before discussing the operation of the receiving system, it is expedient to mention preferred operating conditions to be established. The superregenerative amplifier 12 will be considered to be arranged for saturation-mode, as distinguished from linear-mode, operation. In saturation mode the oscillations generated in any quench cycle achieve saturation-level amplitude before they are quenched, whereas in the linear mode the quenching occurs before the oscillations are able to attain saturation-level amplitude. The oscillatory frequency of the amplifier will be assumed to correspond with the mean frequency of the applied frequency-modulated signal. The oscillatory frequency of the oscillator 13 is preferably approximately subharmonically related to the oscillatory frequency of the amplifier 12 because this gives desired protection to the superregenerative amplifier from the continuous signal present in the circuit of the oscillator 13. It is also sometimes preferred that the saturation-level amplitude of the oscillator 13 exceed the saturation-level amplitude of the amplifier 12. Finally, the values of elements 24 and 25 are chosen to provide in the input circuit of the mixer 21 a time constant that is long relative to the period corresponding to the blocking frequency of the oscillator 13 to permit peak rectification effects to be realized in that circuit.

Figure 2A:
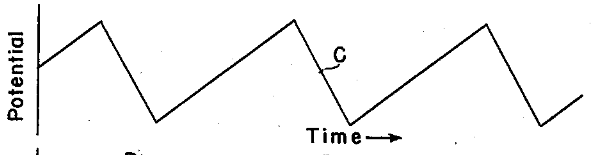
Figure 2B:
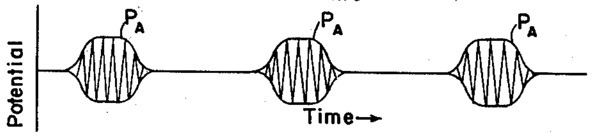
Figure 2C:
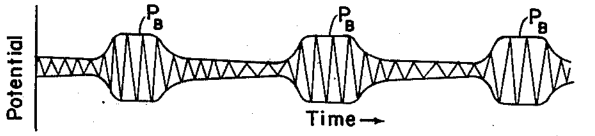
Figure 2D:
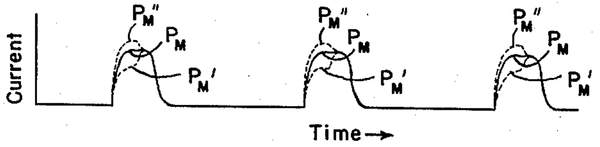

Referring now to Fig. 2*a*, the curve C represents the idealized wave form of the quench signal generated in the blocking oscillator 13 and supplied as a quench signal to the conductance control circuit of the superregenerative amplifier 12. The curves of Figs. 2*b* and 2*c* respectively represent the oscillations produced in the superregenerative amplifier 12 and in the phase-reference oscillator 13 under the control of the quench signal represented by curve C. It will be apparent that the quenching action of the superregenerative amplifier produces in the usual way and in each quench cycle a burst of oscillations $P_A$. This amplifier will be considered to have a sufficient amount of damping to prevent the oscillations generated in one quench cycle from carrying over and influencing those generated in the next succeeding quench cycle. Accordingly, the oscillations of any particular quench cycle are initiated with a phase that varies with and, therefore, is related to the phase of the modulated signal from the source 10 during the maximum-sensitivity period of the quench cycle. The expression "maximum-sensitivity period" is intended to mean the small period in the quench cycle during which the superregenerative amplifier exhibits approximately zero conductance in an excursion from a positive to a negative value of conductance under the influence of the applied quench signal represented by curve C. Therefore, the action of the superregenerative amplifier is analogous to a sampling process by which oscillations $P_A$ are periodically produced with a phase representing the phase of the applied modulated signal at the time of the sampling action, that is, at the time the burst of oscillations $P_A$ is initiated.

The signal output of the blocking oscillator 13 is a continuous signal which, under the control of the quench signal represented by curve C, periodically comprises bursts of oscillations $P_B$ of saturation-level amplitude. It is apparent that the timing established by the quench signal is such that the intervals in which the oscillations $P_B$ of the blocking oscillator are generated start within the saturation interval of the superregenerative amplifier 12. In other words, when the blocking oscillator saturates, the oscillations of the superregenerative amplifier have already reached their saturation-level amplitude. The advantage of this time relationship will be made clear hereinafter. While the oscillatory frequency of the blocking oscillator 13 is subharmonically related to the oscillatory frequency of the superregenerative amplifier 12, the saturation oscillations $P_B$ from the blocking oscillator effectively pulse modulate the mixer 21 so that the electron stream thereof is rich in harmonics of the oscillator frequency. One harmonic-frequency component provides a phase-reference signal of approximately the same frequency as the oscillations $P_A$ of the superregenerative amplifier. Since the oscillator has a continuous, uninterrupted fundamental component, the harmonic thereof, which is used as a reference signal, is effectively a continuous-phase signal even though it actually exists only during the pulse intervals in which the oscillations $P_B$ render the tube 21 conductive. The phase detector responds to the conjoint effect of the phase-reference signal and the modulated signal during phase-comparison intervals to develop an output signal having characteristic variations representing the modulation components of the modulated signal supplied by the source 10. The action of the phase detector 20 in that regard is as follows.

Figure 3:
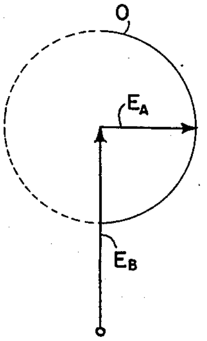

The phase-reference signal may be represented by the vector $E_B$ of Fig. 3 and the oscillation output of the superregenerative amplifier supplied to the control electrode 26 of the tube 21 may be designated by the vector $E_A$, the latter rotating about the former in accordance with the modulation of the signal from the source 10. The particular phase relation of these vectors indicated in Fig. 3 may be considered to be the nominal or average phase relation of the signals during the intervals of phase comparison of the mixer tube 21. During operating instants in which this nominal phase relation exists, the anode-cathode current of the mixer tube 21 is of pulse wave form, as represented by curve $P_M$ of Fig. 2*d*, each pulse of which occurs in timed relation with the saturation oscillations $P_B$ in essentially the manner indicated by the curves of Figs. 2*c* and 2*d*. The anode-cathode current is pulse-modulated in this fashion predominantly because the saturation oscillations $P_B$ of the blocking oscillator have such a large amplitude that they are peak-rectified in the input circuit of the mixer tube, utilizing the first control electrode 23 and the cathode thereof as a two-element rectifier. The time constant of the condenser 24 and the resistor 25 is selected to effect the peak-rectifying action and the large self-bias produced thereby precludes anode current flow in the mixer tube in the intervals which intervene the saturation-level intervals of the blocking oscillator 13. The anode-current pulses of the mixer tube 21 are integrated by the condenser 31 and the resistor 32 to develop a signal of saw-tooth wave form which is applied to and rectified by the diode 22. The signal obtained from the load circuit of the diode 22 by way of the frequency-selective network 36—40 is supplied to the reactance tube 45 which controls the oscillatory frequency of the blocking oscillator 13 to tend to maintain the nominal phase relation of the compared signals represented in Fig. 3.

The nominal phase relation shown in Fig. 3 does not exist, of course, during every interval in which the detector 20 makes a phase comparison. Instead, the phase of the oscillations supplied by the superregenerative amplifier 12 varies in accordance with the modulation of the signal from the source 10 so that the locus of the vector $E_A$ is a circle O. Assume, for example, that the vector $E_A$ defines an angle of less than 90° with the vector $E_B$ during any interval in which the detector 20 makes a phase comparison. The vector $E_A$ may then be considered as representing a resultant vector formed by one vectorial component normal to the vector $E_B$ and one vectorial component which is out of phase with the vector $E_B$. Under this assumed condition, the anode-current pulses of the mixer 21 decrease in amplitude as indicated by the broken-line curve $P_M'$ of Fig. 2*d*. The decrease in amplitude is in accordance with the magnitude of the out-of-phase component of the vector $E_A$. If, on the other hand, it be assumed that the vector $E_A$ defines an angle within the range of 90° to 180° relative to the vector $E_B$, the anode-current pulses of the mixer tube 21 increases as indicated by the broken-line curve $P_M''$ of Fig. 2*d*. The increase in amplitude of the current pulses is in accordance with the magnitude of that vectorial component of the vector $E_A$ which is in phase with the vector $E_B$. The variation in peak amplitude of the anode-current pulses of the tube 21 represents the modulation components of the angular-velocity-modulated signal supplied from the source 10 to the superregenerative amplifier 12. These modulation components are also inherently manifested by the amplitude of the saw-tooth signal resulting from the integration effected by the condenser 31 and resistor 32. Likewise, the signal output of the detector 22 includes the modulation components of the applied frequency-modulated signal. The consequent variations in potential supplied through the filter network 36—40 to the control circuit of the reactance tube 45 vary the oscillatory frequency of the blocking oscillator 13 to tend to maintain substantially fixed the nominal phase relationship illustrated in Fig. 3. Expressed somewhat differently, the control exerted by the reactance tube 45 on the blocking oscillator 13 causes the oscillatory frequency of the latter to tend to follow the frequency deviations of the signal output of the source 10 as manifested by the potential variations of the output signal of the detector 20. Therefore, the control action of the reactance tube 45 amounts to and is in the nature of an effective crushing of the frequency deviations of the applied modulated signal.

Viewed on an average basis, the nominal phase relation of Fig. 3 is maintained substantially fixed although at any particular phase-comparison instant the precise phase relationship deviates in accordance with the rate of change in frequency of the frequency-modulated signal relative to the phase-reference signal. Stable operating conditions result when the locus of the signal vector $E_A$ is represented by the full-line portion of the circle O because the changes in operating frequency of the blocking oscillator 13 for that condition are degenerative, being in a sense directly to restore the nominal phase relationship of Fig. 3. However, the broken-line portion of the circle O relates to unstable conditions. When the signal vector $E_A$ falls within the broken-line portion of the circle O, the change in oscillatory frequency of the oscillator 13 is in a regenerative sense but the regeneration quickly shifts the system back to its stable operating condition. No ambiguity is encountered so long as the system operates in the described stable condition. The parameters of the network 36—40 are selected to supply the modulation components of the received signal to the reactance tube 45 to effect the desired control over the oscillatory frequency of the blocking oscillator 13. It is designed to determine the frequency characteristic of the loop which includes the oscillator 13, the detector 20, and the reactance tube 45 so that the oscillatory frequency of the phase-reference signal may follow the frequency deviations of the signal supplied by the source 10.

The signal output of the reactance tube 45 is also supplied to the unit 46 wherein the desired audio modulation components are selected, amplified, and then delivered to the unit 47 for reproduction.

The receiving system has particularly good amplitude-modulation rejecting properties when the above-described time relationship of the saturation-level oscillations $P_A$ and $P_B$ are established and maintained. The presence of amplitude modulation superposed on the frequency-modulated signal delivered by the source 10 causes a variation in the time of occurrence of the leading edges of the bursts of oscillations $P_A$ generated by the superregenerative amplifier 12, Were these variations permitted to influence the mixer tube 21 of the detector 20, the amplitude modulation would be undesirably passed on to the audio system 46, 47. However, in view of the peak-rectifying properties of the circuit associated with the control electrode 23, the mixing action takes place in the tube 21 at a time when the oscillations $P_A$ have attained saturtaion-level amplitude. This is subsequent to the leading edge of the oscillation envelope and therefore variations in that edge, which reflect the presence of undesired amplitude modulation, are not imparted to the signal output of the mixer 21.

The described peak-rectifying action effectively disables the mixer 21 of the detector 20 except during the saturation-level intervals of the oscillator 13 and provides effective isolation of the superregenerative amplifier 12 from the oscillator 13, especially during the maximum-sensitivity intervals of the superregenerative circuit which occur during blocking intervals of the oscillator 13. For this reason, the superregenerative circuit is not adversely affected by the oscillator 13 even though that oscillator delivers a continuous output signal. Further freedom of the superregenerative circuit from the reference oscillator is inherent in their relative oscillatory frequencies because the oscillator 13 has a fundamental ferquency which is approximately subharmonically related to the oscillatory frequency of the superregenerative circuit. Of course, it is permissible to have the oscillatory frequencies of the units 12 and 13 of the same nominal value so that the fundamental component of the oscillator 13 may be used as the continuous-phase reference signal. However, the advantages mentioned above indicate a preference to a subharmonic relationship of these frequencies.

Instead of integrating the anode-current pulses of the mixer tube 21 in the circuit comprising the condenser 31 and the resistor 32 to produce a saw-tooth signal which can be peak-rectified by the diode 22 to obtain the desired modulation components, the switch 33 may be shifted to its alternate position providing a tuned circuit comprising the condenser 31 and the inductor 34. The circuit may be resonant at the quench frequency of the superregenerative amplifier or at any desired harmonic of that frequency. Moreover, the inductor 34 when used may provide a resonant frequency approximately equal to the oscillatory frequency of the superregenerator 12 or to the frequency of the phase-reference signal derived from the oscillator 13. In either event, a signal of sinusoidal wave form is then supplied to the detector 22 with amplitude variations in accordance with the modulation of the signal received from the source 10. The modulation components may then be obtained by the usual detecting process. The circuit of the detector 22 may be a peak detector or it may be an averaging or an R. M. S. (root-mean-square) detector.

While it is preferred that the superregenerative amplifier 12 be operated in the saturation mode, the system may also be operated with the superregenerative amplifier functioning in the linear mode. Additionally, the mixer tube 21 may take any of a variety of forms including a triode, a diode, or a crystal type of mixer although the advantages discussed above indicate a preference to a pentagrid type of mixer tube.

The principle of phase comparison relied upon to derive the modulation components of the signal supplied by the source 10 may be further explained with reference to the phase time chart of Fig. 4 in which the axis of ordinates designates the phase difference between the signals that are compared in the phase detector while the axis of abscissae denotes time. When the compared signals are of the same frequency and have the nominal phase relationship indicated in Fig. 3, the average phase difference is a constant as indicated by the horizontal line $L_0$. Consequently, at each time $t_1$, $t_2$, $t_3$, $t_4$, etc. when a phase comparison is made in the mixer tube 21, identical phase conditions exist and the anode-current pulses of the tube 21 are as represented by the curve $P_M$ of Fig. 2d. When the signal of the source 10 is frequency-modulated, this result is obtanned only on an average basis in the detector system and not when the detector action is viewed from one sampling interval to the next.

For example, the frequency modulation of the signal from the source 10 may have caused oscillations to be initiated in a particular quench cycle of the amplifier 12 with such a phase that the phase difference at the phase comparison time $t_2$ is as indicated at $\phi_2$ rather than at the fixed value of $L_0$. Where that occurs, the change in potential applied to the reactance tube 45 and the consequent change in the oscillatory frequency of the blocking oscillator 13 causes the frequency of the phase-reference signal to follow the frequency deviation of the signal from the source 10 in an effort to restore the nominal phase relationship indicated in Fig. 3. Conversely, if at the next sampling interval $t_3$ the phase difference detected in the detector 20 is as indicated at $\phi_3$ in Fig. 4, the oscillatory frequency of the blocking oscillator 13 is again changed but in the opposite sense, once more tending to restore the nominal phase relations of Fig. 3. Thus, at each sampling interval a potential is obtained in the detector 20 and applied to the reactance tube 45 to adjust the oscillatory frequency of the blocking oscillator so that at each comparing interval the phase of the compared signals tends to be established at the nominal relation represented in Fig. 3. The sampling intervals are fixed and occur at the quench frequency of the superregenerative amplifier 12 which is the same as the blocking frequency of the oscillator 13.

Figure 4:
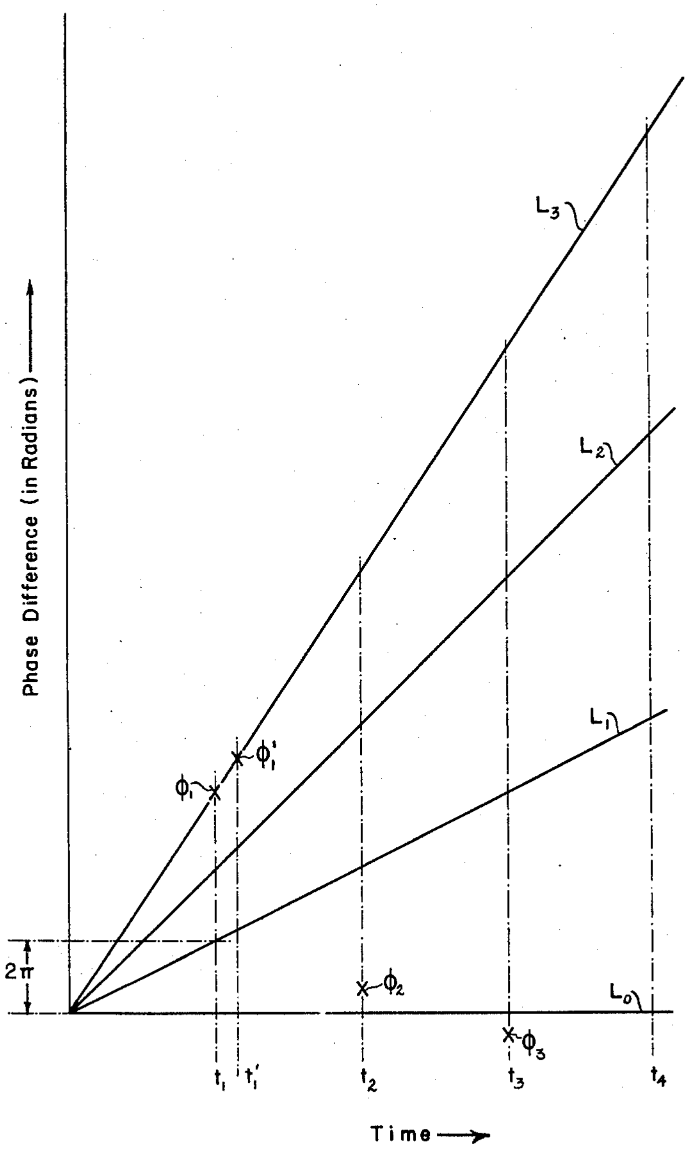

If at the time $t_1$ of Fig. 4 the phase difference had amounted to $2\pi$ radians, then the signals compared would have had frequencies that differ by the quench frequency instead of being signals of the same frequency. The phase difference of such signals, assuming that each remains fixed in frequency, is indicated by the sloped line $L_1$. Had the measured phase difference at the time $t_1$ been $4\pi$ radians, indicating that the compared signals had frequencies differing by twice the value of the quench frequency, then the phase difference characteristic would be as shown by the sloped line $L_2$. In other words, a family of phase time characteristics may be drawn with progressively increasing slopes corresponding to integral multiples of $2\pi$ radians. Three illustrative characteristics $L_1$—$L_3$ have been indicated in Fig. 4. The phase detector 20 in making a phase comparison at the time $t_1$ is unable to determine whether the comparison is in accordance with the characteristic $L_0$ or any member of the famely $L_1$, $L_2$, $L_3$, etc., because (referring to Fig. 3) the detector is unable to determine how many complete revolutions the vector $E_A$ may have made between successive sampling intervals.

It may be shown that the action of the superregenerative amplifier is in the nature of a pulse modulation which produces a component at the oscillatory frequency of the amplifier and multiple slide-band components spaced from the oscillatory frequency by integral multiples of the quench frequency. Each side-band component has a phase related to that of the applied frequency-modulated signal at the period of maximum sensitivity. For that reason, the frequency of the continuous-phase reference signal may, if desired, have a mean value which is different from the oscillatory frequency of the superregenerative amplifier 12 by an integral multiple of the quench frequency. Then the phase comparison may be made on the basis of one of the family of curves $L_1$—$L_3$ of Fig. 4. In selecting the frequency spacing between the reference signal and the oscillatory frequency of the amplifier 12, caution must be taken that the separation be within reasonable limits because the energy of those side-band components which are furthest removed from the oscillatory frequency of the superregenerative amplifier is small. The operation otherwise is essentially as described previously in obtaining the modulation components of the received signal.

A modification of the receiving system of Fig. 1 is indicated schematically in Fig. 5, corresponding components of these systems being identified by similar reference characters. In Fig. 5, the frequency-selective network 40′ is the counterpart of the network 36—40 of Fig. 1 which couples the phase detector to the reactance tube 45. The essential difference in the arrangements of Figs. 1 and 5 is that in the latter the quench signal characteristically generated in the blocking oscillator 13 is also supplied to the phase detector 20 as indicated by the connection 16. The quench signal periodically blocks the phase detector and determines the intervals when the detector is able to make a phase comparison between the oscillations supplied by the superregenerative amplifier 12 and the saturation-level oscillations periodically generated by the oscillator 13. Preferably, the comparison is made only after the oscillations from the amplifier 12 have attained saturation-level amplitude in order that the phase detector may be free from adverse influences of amplitude-modulation components that may be superimposed on the frequency-modulated signal supplied by the source 10.

A further modification of the present invention is represented in Fig. 6 which features a control of the quenching frequency of the superregenerative amplifier and the blocking frequency of the blocking oscillator to maintain the desired nominal apparent phase relationship of the signals which are periodically compared in the phase detector. In this embodiment the superregenerative amplifier 50 comprises a triode vacuum tube 51 and a frequency-determining circuit including an inductor 52, a damping resistor 53, and condensers 54, 55, and 56. A source of unidirectional potential +B is coupled to the anode of the tube through the inductor 52. The cathode of the tube is conductively connected to the junction of the condensers 54 and 55 and is grounded through a signal-frequency choke 57 and a network including a condenser 58 and a resistor 59, the latter constituting a cathode-stabilizing network for stabilizing the superregenerative action. The control electrode of the tube is grounded through a condenser 60, to complete the alternating-current circuits of the amplifier, and through a leak resistor 61. The amplifier 50 is of the separately quenched type, receiving a quench signal from a self-blocking phase-reference oscillator 65.

The blocking oscillator 65 comprises a triode vacuum tube 66 and a frequency-determining resonant circuit 67—71. The anode of the tube 66 is coupled to one side of the frequency-determining circuit, a condenser 73 couples the control electrode to the opposite side thereof, and the cathode is connected to the junction of the condensers 69 and 70 to complete a regenerative oscillatory circuit of the Colpitts type. An auxiliary high-Q or low-decrement resonant circuit, including an inductor 74 and a condenser 75, is inductively coupled to the resonant circuit 67—71 to ensure that residual oscillations endure throughout each block interval of the blocking oscillator to produce the continuous-phase reference signal. The condenser 73 in conjunction with a resistor 89 provides a control-electrode circuit-blocking network for the oscillator and stabilization of the oscillator operation is afforded by condensers 86 and 88 and resistors 85 and 87 through which the control electrode of the tube 66 is returned to a unidirectional potential source +B via the resistor 85. The anode of the tube 66 is coupled to a source of space current indicated +B through the inductor 67 and a resistor 77. The condenser 71 is effectively connected in parallel with the resistor 77 to provide therewith a wave-shaping network for developing a quench signal for application through a condenser 62 to the superregenerative amplifier 50. This quench signal is supplied to the control-electrode cathode circuit of the tube 51 to control the conductance thereof as required to effect superregenerative amplification of an applied wave signal.

The phase detector in the embodiment of Fig. 6 comprises a triode vacuum tube 80 having series-connected inductors 81 and 82 included in its control electrode-cathode circuit and coupled, respectively, to the frequency-determining circuits of the superregenerative amplifier 50 and the reference oscillator 65. The input circuit of the triode tube 80 further includes a condenser 83 and a resistor 84 chosen of such values as to have a time constant that is long compared with the period corresponding to the quenching frequency of units 50 and 65. The anode of the tube 80 is coupled to the unidirectional potential source +B through the resistor 85.

A frequency-selective network is coupled between the output circuit of the detector 80 and the input electrodes of the oscillator tube 66 to provide a degenerative feed-back path for controlling the blocking frequency of the oscillator to tend to maintain a substantially fixed phase relationship between the signals compared in the phase detector. This network includes the elements 86, 87, the condenser 88 bridging the resistor 87 and the blocking network 73, 89. The elements 87, 88 have such values that their time constant is long compared with the period of the mean quench frequency.

The angular-velocity-modulated signal to be translated by the receiver is supplied to the superregenerative amplifier 50 from the signal source 10 and the modulation components thereof, obtained in the output circuit of the detector 80, are supplied to the audio system 46, 47 for utilization in the usual manner.

In considering the operation of the arrangement of Fig. 6, it will be seen that the blocking oscillator 65 is essentially a Colpitts oscillator in which the blocking network is included in the control electrode-cathode circuit and is provided principally by the condenser 73 and the resistor 89. The auxiliary tuned circuit 74, 75 ensures that there are residual oscillations throughout the blocking intervals so that the oscillator produces a continuous-phase signal which has saturation-level amplitude during the conductive intervals of the tube 66. The anode-cathode current of the tube 66 is in the form of pulses and is shaped by the network 71, 77 to develop a suitable quench signal for application to the superregenerative amplifier 50 which operates in essentially the same manner as the corresponding unit of the arrangement of Fig. 1. It is preferred that the saturation-level oscillations periodically generated in the superregenerative amplifier 50 and those produced in the blocking oscillator 65 have the time relationship indicated and explained in conjunction with Figs. 2b and 2c so that the receiving system exhibits good amplitude-modulation rejecting properties. The oscillatory frequency of the phase-reference oscillator 65 is selected of such value that a particular harmonic thereof, for example the second harmonic, has a frequency which is equal to the oscillatory frequency of the superregenerative amplifier 50 or which is spaced therefrom by an integral multiple of the nominal quench frequency. It is also desirable that the control electrode and cathode of the mixer tube 80 with the network 83, 84 effect peak rectification of the signal supplied thereto from the blocking oscillator 65 so that the tube 80 is able to conduct only during intervals when it is desired to make a phase comparison of the oscillations from the superregenerative amplifier 50 and the selected harmonic of the signal generated in oscillator 65. It is this pulsed operation of the tube 80 that produces the harmonics of the signal supplied by the oscillator 65 and provides the desired continuous-phase reference signal in essentially the same manner as described in connection with Fig. 1.

The phase relation of the oscillations from the superregenerative amplifier 50 and the selected harmonic of the oscillator 65 determines the magnitude of the anode-current pulses of the mixer or phase detector tube 80. Since the phase of the oscillations from the superregenerative amplifier varies with and is related to the phase of the modulated signal from the source 10 at the maximum sensitive period of each quench cycle, the relative phase of the compared signals similarly varies from one phase-comparison interval of the detector 80 to the next. Accordingly, the magnitude of the anode-current pulses of that tube manifests the modulation of the applied angular-velocity-modulated signal. The modulation components appearing in the output signal of the detector tube 80 are selected by the audio-frequency filter in unit 46 and are reproduced by the sound system 47 after suitable audio-frequency amplification in the unit 46. The frequency-selective network 86—87—88 also applies through the resistor 89 a degenerative feed-back voltage to the input electrodes of the oscillator tube 66. This feed-back voltage varies the quench frequency of the blocking oscillator 65 and the superregenerative amplifier 50 in a sense tending to maintain substantially fixed apparent phase relationships between the compared signals during the intervals of phase comparison of the detector 80.

The modification of the blocking frequency of the reference oscillator 65, and thus the change in quench frequency of the superregenerative amplifier, required to maintain a desired nominal apparent phase relation between the compared signals may be understood with reference to the phase characteristic $L_3$ of Fig. 4. If at a particular sampling instant $t_1'$ the phase of the compared signals has the value represented at $\phi_1'$ when in fact the nominal phase relation desired to be maintained is that of $\phi_1$, it is apparent that the frequency of the quenching action must be modified. It must in fact be increased so that the sampling takes place earlier at the time $t_1$ when the desired nominal phase relation $\phi_1$ is presented. The degenerative control potential supplied from the detector tube 80 through the frequency-selective network 86—88 to the blocking oscillator 65 accomplishes such a change in quench frequency and thereby tends to maintain the desired nominal apparent phase relationship of the compared signals.

As previously indicated, the phase comparison utilized in deriving the modulation components of the applied signal is effected by comparing the phase of a reference signal with that of another signal having a phase related to that of the applied modulated signal. Moreover, as also explained above, the compared signals may be of approximately the same nominal frequency or they may have frequencies which are spaced by multiples of the quench frequency. It may be shown that the amount of correction or control effected by a given adjustment in the quench frequency is related to the frequency separation of the compared signals as measured in terms of the quench frequency. The larger the frequency separation, the larger is the resulting correction or change of phase relation of the compared signals. As a consequence, when the compared signals have a large frequency separation a relatively small value of correction potential supplied by the frequency-selective network 86—88 to the control electrode-cathode circuit of the tube 66 is sufficient to modify the quench frequency as required to maintain the desired apparent phase relations of the compared signals at the instants of phase comparison.

In discussing the several modifications of the invention, the expression "apparent phase relationship" has been used to signify the phase relations observed at any comparison interval. For the most part, the signals that are compared to derive the modulation components are not of identical frequency and consequently have no fixed phase relation. The expression "apparent phase relation" is intended to mean the relative phases of such signals at the comparison interval. As shown in Fig. 3 and described above, the systems tend to maintain the compared signals at an apparent quadrature-phase relation. This provides the greatest handling capacity, and for that reason it is the preferred mode of operation although, if desired, the systems may be operated to tend to stabilize at other apparent phase relations.

Each of the described embodiments of the invention represents an efficient receiving system for translating an angular-velocity-modulated wave signal. Where the described time relationship of the quenching or blocking action in the superregenerative amplifier and the reference oscillator are maintained, such receivers exhibit marked amplitude-modulation rejecting properties.

In one arrangement of the type represented in

Fig. 1 found to have practical utility, the following parameters were employed:

| | |
|---|---|
| Tube 21 | Type 12BE6 |
| Condenser 24 | 100 micromicrofarads |
| Condenser 27 | 500 micromicrofarads |
| Condenser 30 | 0.25 microfarad |
| Condenser 31 | 25 micromicrofarads |
| Condenser 35 | 1000 micromicrofarads |
| Condensers 39, 40 | 100 micromicrofarads |
| Resistor 25 | 1 megohm |
| Resistor 28 | ½ megohm |
| Resistors 29, 32 | 220,000 ohms |
| Resistors 36, 37 | 100,000 ohms |
| Resistor 38 | 470,000 ohms |
| Oscillatory frequency of super-regenerative amplifier 12 | 22 megacycles |
| Mean oscillatory frequency of oscillator 13 | 11 megacycles |
| Blocking or quench frequency | 100 kilocycles |
| Frequency deviation of modulated signal delivered by source 10 | ±75 kilocycles |
| Value of the potential +B | 100 volts |

One receiving system of the type represented in Fig. 6 found to have practical utility had component values as follows.

| | |
|---|---|
| Superregenerative amplifier 50: | |
| Tube 51 | ½ section of a type 12AT7 |
| Resistor 53 | 8200 ohms |
| Resistor 59 | 5000 ohm potentiometer |
| Resistor 61 | 250,000 ohm potentiometer |
| Condensers 54, 55 | 10 micromicrofarads |
| Condenser 56 | 5000 micromicrofarads |
| Condenser 58 | 0.1 microfarad |
| Condenser 60 | 300 micromicrofarads |
| Condenser 62 | 0.02 microfarad |
| Oscillatory frequency | 22 megacycles |
| +B supply | 250 volts |
| Reference oscillator 65: | |
| Tube 66 | ½ section of a type 12AT7 |
| Resistor 68 | 33,000 ohms |
| Resistor 77 | 15,000 ohms |
| Condensers 69, 70 | 30 micromicrofarads |
| Condenser 71 | 500 micromicrofarads |
| Condenser 73 | 70 micromicrofarads |
| Resistor 89 | 27,000 ohms |
| Oscillatory frequency of circuits 74—75 and 67—71 | 10 megacycles |
| Blocking frequency | 110 kilocycles |
| +B supply | 250 volts |
| Phase detector 80: | |
| Tube 80 | ½ section of a type 12AT7 |
| Condenser 83 | 25 microfarads |
| Condenser 86 | 1000 micromicrofarads |
| Condenser 88 | 1.0 microfarad |
| Resistor 84 | 3.3 megohms |
| Resistors 85, 87 | 270,000 ohms |
| Frequency difference of compared signals | 2 megacycles |
| +B supply | 250 volts |

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal; an impedance network coupled in circuit with said amplifier and said oscillator for synchronizing the quenching action of said amplifier and the blocking action of said oscillator; a phase detector for receiving and for comparing the apparent relative phase of said oscillations of said amplifier and said phase-reference signal to develop an output signal having characteristic variations representing the modulation components of said modulated signal; and means responsive to said output signal to tend to maintain a substantially fixed apparent phase relationship between said oscillations of said amplifier and said phase-reference signal.

2. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal; means for deriving a quench signal from said oscillator and for applying said quench signal to said amplifier; a phase detector for receiving and for comparing the apparent relative phase of said oscillations of said amplifier and said phase-reference signal to develop an output signal having characteristic variations representing the modulation components of said modulated signal; and means responsive to said output signal to tend to maintain a substantially fixed apparent phase relationship between said oscillations of said amplifier and said phase-reference signal.

3. A system for receiving an angular-velocity-modulated wave signal comprising: a saturation-mode superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal; a resistor-condenser network coupled to said amplifier and responsive to the operation of said oscillator for so timing the quenching action of said amplifier and the blocking action of said oscillator that the oscillation-generating intervals of said oscillator commence within the saturation intervals of said amplifier; a phase detector for receiving and for comparing the apparent relative phase of said oscillations of said amplifier and said phase-reference signal to develop an output signal having characteristic variations representing the modulation components of said modulated signal; and means responsive to said output signal to tend to maintain a substantially fixed apparent phase relationship between said oscillations of said amplifier and said phase-reference signal.

4. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal; a phase detector for receiving and for comparing the apparent relative phase of said oscillations of said amplifier and said phase-reference signal to develop an output signal having characteristic variations representing the modulation components of said modulated signal; a time-constant network coupled to said oscillator and to said detector for effectively disabling said detector except during saturation intervals of said oscillator; and means responsive to said output signal of said detector to tend to maintain a substantially fixed apparent phase relationship between said oscillations of said amplifier and said phase-reference signal.

5. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal; a phase detector for receiving and for comparing the apparent relative phase of said oscillations of said amplifier and said phase-reference signal to develop an output signal having characteristic variations representing the modulation components of said modulated signal; a peak rectifier circuit included in said detector and responsive to said phase-reference signal for effectively disabling said detector except during saturation intervals of said oscillator; and means responsive to said output signal of said detector to tend to maintain a substantially fixed apparent phase relationship between said oscillations of said amplifier and said phase-reference signal.

6. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal; a phase detector for receiving and for comparing the apparent relative phase of said oscillations of said amplifier and said phase-reference signal to develop an output signal having characteristic variations representing the modulation components of said modulated signal; means for deriving a quench signal from said oscillator and for applying said quench signal to said detector effectively to disable said detector except during saturation intervals of said oscillator; and means responsive to said output signal of said detector to tend to maintain a substantially fixed apparent phase relationship between said oscillations of said amplifier and said phase-reference signal.

7. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal of approximately the same frequency as said superregenerative oscillations; an impedance network coupled in circuit with said amplifier and said oscillator for synchronizing the quenching action of said amplifier and the blocking action of said oscillator; a phase detector for receiving and for comparing the apparent relative phase of said oscillations of said amplifier and said phase-reference signal to develop an output signal having characteristic variations representing the modulation components of said modulated signal; and a reactance-tube circuit responsive to said output signal for varying the oscillatory frequency of said oscillator to tend to maintain a substantially fixed apparent phase relationship between said oscillations of said amplifier and said phase-reference signal.

8. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of each said quench cycle; a signal generator, including a blocking oscillator having an oscillatory frequency subharmonically related to the oscillatory frequency of said amplifier and having residual oscillations throughout each blocking interval, for generating a continuous-phase reference signal of approximately the same frequency as said generated oscillations; an impedance network coupled in circuit with said amplifier and said oscillator for synchronizing the quenching action of said amplifier and the blocking action of said osscillator; a phase detector for receiving and for comparing the apparent relative phase of said oscillations of said amplifier and said phase-reference signal to develop an output signal having characteristic variations representing the modulation components of said modulated signal; and means responsive to said output signal for varying the oscillatory frequency of said oscillator to tend to maintain a substantially fixed apparent phase relationship between said oscillations of said amplifier and said phase-reference signal.

9. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator having residual oscillations throughout each blocking interval, for generating a continuous-phase reference signal having a frequency differing from the oscillatory frequency of said amplifier by an integral multiple of the mean quench frequency of said amplifier; an impedance network coupled in circuit with said amplifier and said oscillator for synchronizing the quenching action of said amplifier and the blocking action of said oscillator; a phase detector for receiving and for comparing the apparent relative phase of said oscillations of said amplifier and said phase-reference signal to develop an output signal having characteristic variations representing the modulations componets of said modulated signal; and means responsive to said output signal for varying the quench frequency of said amplifier and said oscillator to tend to maintain a substantially fixed apparent phase relationship between said oscillations of said amplifier and said phase-reference signal.

10. A system for receiving an angular-velocity-modulated wave signal comprising: a superregenerative amplifier, arranged to have said modulated signal applied thereto, for generating in each quench cycle thereof oscillations having a phase varying with the phase of said modulated signal during the maximum-sensitivity period of said each quench cycle; a signal generator, including a blocking oscillator of the self-quenching type having residual oscillations throughout each blocking interval, for generating a continuous-phase reference signal having a frequency differing from the oscillatory frequency of said amplifier by an intergal multiple of the mean quench frequency of said amplifier; means for deriving a quench signal from said oscillator and for applying said quench signal to said amplifier; a phase detector for receiving and for comparing the apparent relative phase of said oscillations of said amplifier and said phase-reference signal to develop an output signal having characteristic variations representing the modulation components of said modulated signal; and means responsive to said output signal for varying the quench frequency of said oscillator to tend to maintain a substantially fixed apparent phase relationship between said oscillations of said amplifier and said phase-reference signal.

DONALD RICHMAN.

REFERENCES CITED

The following references are of record in the file of this patent:

UNITED STATES PATENTS

| Number | Name | Date |
|---|---|---|
| 2,273,090 | Crosby | Feb. 17, 1942 |
| 2,462,759 | McCoy | Feb. 22, 1949 |